Nov. 20, 1951 — LE ROY D. YODER — 2,575,986
BALE HANDLING HOOK
Filed March 21, 1949
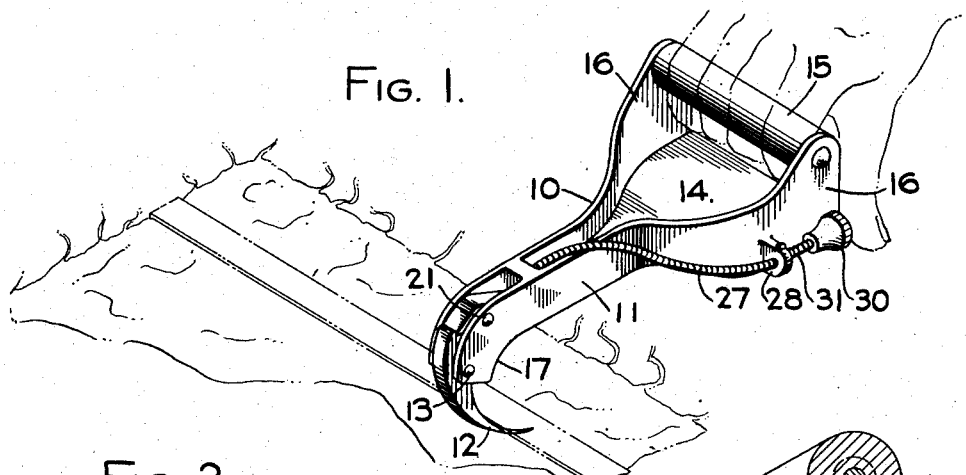
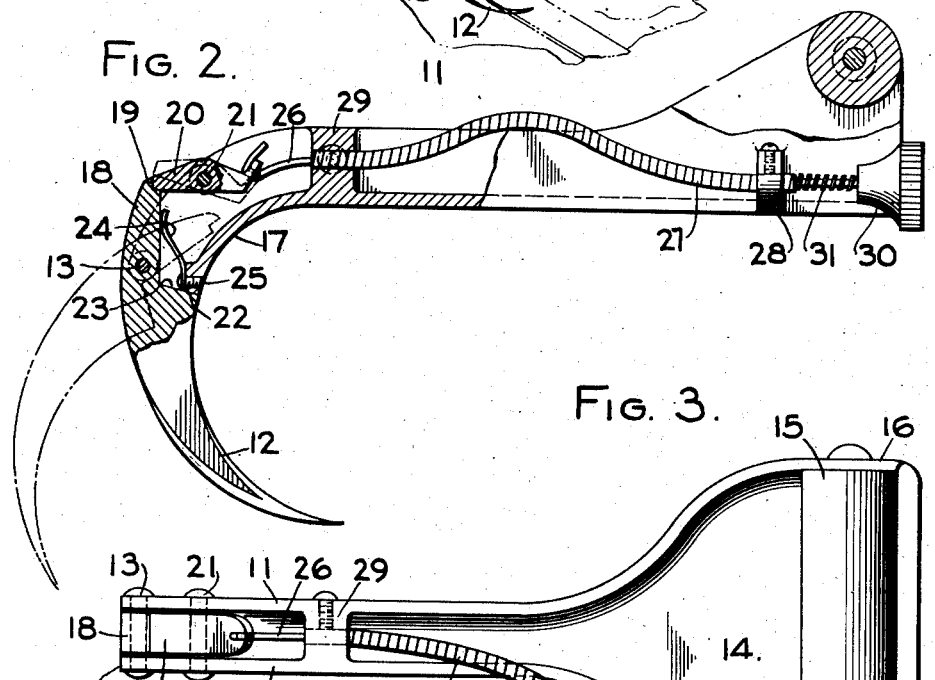
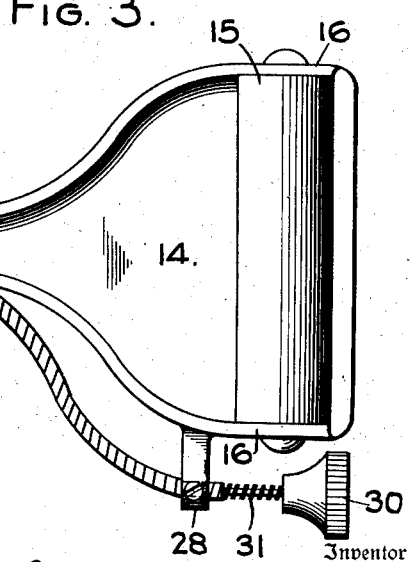
Inventor
Le Roy D. Yoder
By Walter P. Geyer
Attorney Patented Nov. 20, 1951

2,575,986

UNITED STATES PATENT OFFICE 2,575,986

BALE HANDLING HOOK

Le Roy D. Yoder, Clarence Center, N. Y.

Application March 21, 1949, Serial No. 82,687

2 Claims. (Cl. 294—26)

This invention relates to certain new and useful improvements in trip hooks or implements for facilitating the handling of baled hay and other baled commodities.

It has for one of its objects to provide a bale hook of this character which is so designed and constructed as to afford maximum protection to the hand of the user against chaffing or injury during the handling of the bales and to permit the ready release of the hook from the bale when desired.

Another object of the invention is to provide a trip bale hook which is light yet strong, durable and inexpensive in construction, and whose releasing mechanism is simple and adapted to be conveniently governed by the user.

Other features of the invention reside in the construction and arrangement of parts hereinafter described and particularly pointed out in the appended claims.

In the accompanying drawings:

Figure 1 is a perspective view of the bale handling hook embodying my invention. Figure 2 is an enlarged side elevation thereof, partly in section. Fig. 3 is a top plan view thereof.

Similar characters of reference indicate corresponding parts throughout the several views.

In the preferred embodiment of my invention shown in the drawings, it consists of a channeled body 10 cast from aluminum or the like and including a comparatively narrow shank portion 11 at one end on which the hooking tine or prong 12 is pivoted at 13 to swing in the plane thereof, and a widened handle or gripping portion 14 at its other end having a round hand-engaging grip 15 disposed between the rear ends of the upstanding flanges 16 formed on the channeled body. It will be noted that this hand grip is spaced above the flat bottom of the body-portion 14 to allow the fingers to freely embrace the grip and at the same time form a guard or protective shield to protect the hand of the user from contact with the bales and against chafing or injury during the handling of the bales.

The front end of the shank 11 terminates in a downwardly curved extension 17 of like channel shape and the hooking tine 12 is pivoted intermediate its ends on the pivot 13 located at the lower extremity of such extension, while the upper arm 18 of the tine normally extends substantially vertically and terminates at its upper end in a shoulder 19 disposed approximately in the plane of the closed bottom wall of the shank, as shown in Figure 2. Cooperating with this shoulder for releasably retaining the tine in its operative hooking position, shown by full lines in such figure, is a dog or latching pawl 20 disposed in a substantially horizontal position between the shank-flanges and pivoted intermediate its ends thereto on a transverse pivot 21. Companion downwardly and upwardly facing shoulders 22 and 23 formed on the extension 17 and tine 12, respectively, limit the swing of the tine inwardly or toward the shank of the tool, while the latching pawl 20 releasably retains it in such position, and a flat spring 24 fixed at 25 to the extension 17 and bearing at its free end against the inner face of the tine-arm 18 normally urges the tine to such latched, limit-stop position. Upon the release of the latching pawl from the tine-shoulder 19, the tine is free to be displaced to the outwardly swung position shown by dotted lines in Figure 2, and in which position the tool can be readily freed from the bale.

For the purpose of conveniently effecting the release of the pawl 20 from the tine when it is desired to unhook the tool from the bale, I provide an actuating rod or stem 26 in the form of a wire guided in a cable 27 extending generally lengthwise of the body 10 and secured at its rear end to an exterior lug 28 on the handle portion 14 of the tool and at its front end to a web 29 formed in the channel portion of the shank 11. The rear end of this stem has an actuating knob or button 30 thereon while its front end is connected to the latching pawl 20. A spring 31 applied to this stem and bearing at one end against its knob and at its other end against the opposing end of the cable guide normally urges the rod to its pawl-latching position. It will be noted in Figure 1 that the knob 30 is disposed at one side of the handle portion of the tool so that in use, with the hand engaging the grip 15, the thumb is directly over the knob for conveniently depressing it to unlatch the pawl and free the tool from the bale.

I claim as my invention:

1. A tool for handling bales and the like, comprising a substantially channel-shaped body including a shank at one end having a hooking tine pivoted thereon and a widened handle portion at its other end having a hand grip thereon spanning the resulting flanges of said body and spaced from the web portion thereof, the latter forming a protective shield for the hand of the user when engaging said grip, and means including a latching pawl pivoted on said shank and engageable with said hooking tine for releasably latching it in its normal position and an actuating stem guided on said body and connected at one end to said pawl and having a knob at its other end disposed exteriorly of one of the body flanges and in adjoining relation to said hand grip.

2. A tool for handling bales and the like, comprising a substantially channel-shaped body including a shank at one end terminating in a downwardly turned extension providing a downwardly-facing stop shoulder and a handle portion at its other end having a hand grip thereon, a pendant hooking tine pivoted intermediate its ends on said extension and having a stop shoulder at its lower end normally engageable with said companion extension stop shoulder and a shoulder at its upper end, a spring applied to said extension in bearing contact with said tine for normally urging it to its hooking position, a latching pawl pivoted on said shank above and rearwardly of the tine-pivot for releasable engagement with the upper shoulder of the tine, and an actuating stem guided for longitudinal movement on said body and connected at one end to said latching pawl and provided at its opposite end with a thumb-engaging knob disposed alongside said hand grip.

LE ROY D. YODER.

REFERENCES CITED

The following references are of record in the file of this patent:

UNITED STATES PATENTS

| Number | Name | Date |
| --- | --- | --- |
| 782,302 | Williams | Feb. 14, 1905 |
| 1,484,495 | Hatherley | Feb. 19, 1924 |
| 2,138,694 | Daugherty | Nov. 29, 1938 |